United States Patent [19]
Stolz et al.

[11] Patent Number: 5,375,580
[45] Date of Patent: Dec. 27, 1994

[54] INTERNAL COMBUSTION ENGINE WITH COOLING OF INTAKE AIR USING REFRIGERATION OF LIQUEFIED FUEL GAS

[75] Inventors: Jack L. Stolz, Allentown; William P. Hegarty, State College; Anthony A. Cassano, Allentown; James G. Hansel, Emmaus, all of Pa.

[73] Assignee: Air Products and Chemicals, Inc., Allentown, Pa.

[21] Appl. No.: 118,542

[22] Filed: Sep. 8, 1993

Related U.S. Application Data

[63] Continuation-in-part of Ser. No. 824,621, Jan. 23, 1992, abandoned.

[51] Int. Cl.⁵ .................................................. F02M 21/04
[52] U.S. Cl. ................................. 123/527; 123/542; 123/563
[58] Field of Search ............... 123/525, 526, 527, 528, 123/542, 563

[56] References Cited

U.S. PATENT DOCUMENTS

| | | | |
|---|---|---|---|
| 3,141,293 | 7/1964 | Crooks | 60/13 |
| 3,306,032 | 2/1967 | Chaffiotte | 60/13 |
| 3,577,726 | 5/1971 | Wagner | 123/528 |
| 4,033,135 | 7/1977 | Mandrin | 60/618 |
| 4,104,999 | 8/1978 | Ulrich | 123/563 |
| 4,742,801 | 5/1988 | Kelgard | 123/27 |
| 5,081,977 | 1/1992 | Swenson | 123/563 |
| 5,105,790 | 4/1992 | Nye, Jr. | 123/527 |

FOREIGN PATENT DOCUMENTS 954321 4/1964 United Kingdom .

OTHER PUBLICATIONS

T. Joyce, "LNG as a Transportation Fuel", The LNG Observer, Spring, 1990, vol. 1, No. 1, p. 9.

*Primary Examiner*—Raymond A. Nelli
*Assistant Examiner*—Erick Solis
*Attorney, Agent, or Firm*—William F. Marsh

[57] ABSTRACT

A turbocharged or supercharged internal combustion motive system for utilization of gaseous fuel stored as a liquid wherein the liquefied gaseous fuel is vaporized and warmed at least partially with heat removed from the compressed intake combustion air in the turbocharger or supercharger aftercooler. In a preferred embodiment, the compressed intake combustion air is first cooled in an aftercooler against an ambiently cooled coolant and is subsequently cooled in further aftercooler heat exchange passages against an intermediate coolant which transfers heat removed from the compressed intake combustion air to the liquefied gaseous fuel. Embodiments are disclosed wherein the saturated liquefied gaseous fuel is first subcooled and then pumped to pressures high enough for direct combustion chamber injection and another embodiment discloses vaporization of the saturated liquefied gaseous fuel with compression of the vaporized gas in a compression-type injection system or by low pressure carburetion into the internal combustion engine.

5 Claims, 4 Drawing Sheets

INTERNAL COMBUSTION ENGINE WITH COOLING OF INTAKE AIR USING REFRIGERATION OF LIQUEFIED FUEL GAS

This is a continuation-in-part of copending application Ser. No. 07/824,621 filed Jan. 23, 1992, now abandoned.

BACKGROUND OF THE INVENTION

Shortages of motor fuels several years ago prompted many efforts toward alternative fuels. Compressed natural gas has been utilized as a fuel, for automotive as well as train locomotive fuel. The large storage volume and the requirement for pressure containment create serious limitations in its use. Using liquefied natural gas or liquefied methane at cryogenic temperatures but at substantially atmospheric pressures permits the carrying of nearly five times as much fuel in the liquefied state as in the compressed gas state at about 2,000 psi (136 bar) with equivalent space requirements. Compared with diesel fuel, the equivalent fuel value of liquefied gas requires about twice the fuel storage volume. In railroad locomotive use, fuel costs comprise typically in excess of 10% of a railroad's operating costs, which provides a strong incentive for highly efficient utilization of fuel. Use of natural gas or substantially pure methane at current price levels can result in fuel cost savings of approximately 10-15% from use of No. 2 diesel fuel. It is anticipated that the price of reformulated, cleaner burning diesel fuels will further increase the price differential.

Most large locomotive diesel cycle engines are supercharged, where the intake air compressor is mechanically driven or turbocharged, with exhaust gases from the engine being expanded through a high speed rotary expander to drive a rotary, centrifugal compressor to compress the incoming air charge to the combustion cylinders. The supercharging or turbocharging of the intake air raises the temperature of the air. This heated air adversely affects the performance of the engine by decreasing the density of the intake air, and therefore limiting the available mass of intake air for a given engine displacement and by increasing the likelihood of detonation of the fuel charge in the cylinders. It has been known to increase the performance of supercharged or turbocharged internal combustion engines by cooling the compressed intake air either after the supercharger or turbocharger or even between the supercharger or turbocharger stages. This cooling is most often accomplished by heat exchange with either a recycled cooling medium such water which then is heat exchanged with an external cooling medium such as air in the case of land-based, stationary power plants or sea water in the case of shipboard power plants or power plants with adequate cooling water supplies. In other instances, the intake air is cooled by heat exchange with surrounding air using a radiator such as a fin and tube heat exchanger. In both these processes, the temperature of the cooled intake air will still be above the temperature of the ambient cooling medium unless additional energy and refrigeration equipment is employed. In the case of a truck, bus, railroad locomotive or stationary engine using ambient air cooling, this intake cooled intake air will be 10° F. to 20° F. (approximately 5° C. to 10° C.) higher than the ambient air temperature. In summer conditions, this may result in an intake air temperature, even after cooling, of 100° F. to 120° F. (38° C. to 49° C.) In other instances, mechanical refrigeration systems have been utilized to achieve controlled cooling of the intake air to desired temperatures substantially independent of ambient temperature conditions. U.S. Pat. Nos. 3,306,032 and 3,141,293 disclose mechanical refrigeration systems for cooling the compressed intake air.

U.S. Pat. No. 4,742,801 describes apparatus for pumping and vaporizing a cold liquefied gas for fuel to a dual fueled internal combustion engine and particularly a diesel engine. However, it does not teach the advantage of using the cold liquefied gas to cool the incoming intake combustion air.

An article by Thomas Joyce in the Spring, 1990 issue of The LNG Observer, Volume 1, No. 1, describes the use of LNG, or liquefied natural gas, as a fuel for an automobile with an LNG vaporizer mounted in the engine compartment of the automobile utilizing engine coolant to heat and vaporize the LNG. It is also suggested that the refrigeration of the LNG could be utilized to cool the incoming air and to thereby, "in essence, supercharge the engine to boost its power." However, although this article alludes to the cooling effect as providing the equivalent of supercharging, it does not deal with the cooling of compressed and heated intake air resulting from the use of a turbocharger or supercharger nor does it teach the controlled aftercooling of the compressed intake air to achieve balanced operation of the vaporizer and aftercooler.

SUMMARY OF THE INVENTION

This invention relates to an internal combustion engine to which compressed intake combustion air is supplied using, for example, a supercharger or turbocharger, and which is fueled with a liquefied fuel gas, such as, for example, liquefied petroleum gas (LPG), liquefied propane (LP), refrigerated liquid methane (RLM), or liquefied natural gas (LNG). Generally, this invention would be applicable to power plants utilizing any gaseous fuel that can be stored as a liquid at pressures at or below about 200 psig (14 bar-g) and which can achieve adiabatic expansion temperatures of below about 50° F. (10° C.) from such storage pressures. Such internal combustion engines may be used in powering many devices, either stationary or moving. Commonly, such internal combustion engines are used also for locomotive power for transport vehicles such as cars, trucks, buses, railroad locomotives, and ship propulsion. Such internal combustion engines may also be used with stationary power plants, such as emergency power generators.

Specifically, this invention relates to a method and apparatus for fueling an internal combustion engine to which compressed intake combustion air is supplied using, for example, a supercharger or turbocharger, and which is fueled with a liquefied fuel gas, such as, for example, liquefied petroleum gas (LPG), liquefied propane (LP), refrigerated liquid methane (RLM), or liquefied natural gas (LNG) wherein the cold revaporized fuel gas is heat exchanged with the compressed intake combustion air to cool said compressed intake combustion air to improve efficiency and performance of the engine.

The object of this invention is to utilize the refrigeration content of the liquefied fuel gas to cool the intake air charge during or subsequent to the compression stages. This heat interchange between the heated intake air and the cold liquefied fuel gas serves two complementary purposes. First, it warms the liquefied fuel gas from its cold state to a temperature that permits most efficient operation of the internal combustion engine. Secondly, the heat exchange cools the compressed intake air to a temperature that can be substantially at or even below ambient air or water temperatures to achieve the optimum intake charge temperature to the internal combustion engine. This heat exchange can be accomplished with a great deal of control through relatively simple heat exchange systems which are compact due to the large available temperature difference between the cold liquefied fuel gas and the heated, compressed intake air.

The benefits of this invention include not only the increased power and efficiency available from using a lower temperature intake air charge than may be available using ambient air or water cooling, but also reduced pollution in the form of reduced NOx emissions from the engine since the lowered air/fuel mixture charge temperature can produce combustion at lower internal combustion temperatures. In addition, the equipment can be simplified and the required size of the heat exchangers reduced. This simplification and size reduction can be a significant benefit in transport vehicles such as trucks, buses, railroad locomotives, and ships.

In many applications, the refrigeration available in the liquefied fuel gas may not be sufficient to fully cool the compressed and heated intake air charge due to the relative heat balances of the intake air and corresponding fuel usage. In these cases, the heated compressed intake air can first be conventionally heat exchanged against the ambient heat source such as air, water or recycled cooling water system. The thus cooled intake air may then be heat exchanged against the cold liquefied fuel gas to subcool the intake air charge to the desired inlet temperature to the internal combustion engine.

In an internal combustion engine fueled with a fuel gas vaporized from a liquefied gaseous fuel and having means for compressing combustion intake air and an aftercooler for cooling the compressed combustion intake air, the improvement of this invention comprises heat exchange means for effecting heat exchange between the fuel and the compressed combustion intake air whereby heat is removed from the compressed combustion intake air and said heat is transferred to the fuel. More particularly, this invention includes a preferred embodiment wherein the compressed combustion intake air is cooled in cascade first against an ambient coolant and then to a lower temperature either directly or indirectly against the liquefied gaseous fuel.

DETAILED DESCRIPTION OF THE INVENTION

The invention will now be described in detail as it would be employed in a railroad locomotive utilizing refrigerated liquid methane as fuel for its diesel internal combustion engine. Refrigerated liquid methane (RLM) is a preferred, premium fuel for this application. While liquefied natural gas (LNG) and other liquefied gaseous fuels such as LPG could well be used, their variable compositions do not facilitate the fine tuning of the engine to the constant fuel composition and suitable octane rating of the RLM to achieve maximum power and engine efficiency. With this explanation, and with an understanding of the invention and its benefits as so explained, it would be a matter of ordinary engineering to persons skilled in the art to apply the invention and the teachings of this description to other applications of internal combustion engines utilizing supercharged or turbocharged air intake systems in conjunction with liquefied fuel gases, such as in trucks, buses, ships, cars and stationary engines with fuels such as liquefied natural gas (LNG), liquefied petroleum gas (LPG) or even liquid hydrogen ($LH_2$).

Figure 1:
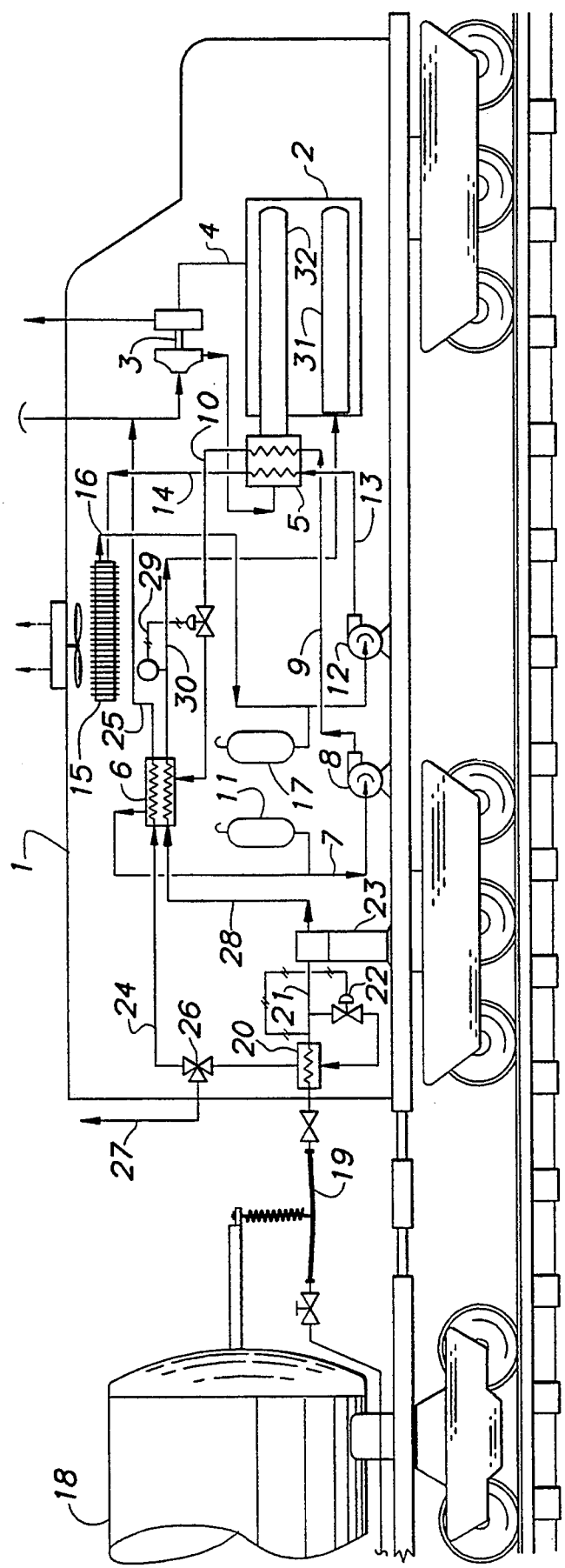
FIG. 1 shows the embodiment of the invention in a railroad locomotive adapted to be fueled with refrigerated liquid methane carried in an insulated tender car in which the refrigerated liquid fuel is taken from the storage tender, is subcooled and pumped as a liquid to a high injection pressure and is then vaporized with heat removed from the compressed intake combustion air in the turbocharger or supercharger aftercooler.

In FIG. 1, a railroad diesel locomotive 1 powered by a diesel engine 2 to be fueled with refrigerated liquid methane (RLM) is shown schematically. The diesel engine 2 is coupled in this case to a turbocharger 3, which is powered by the exhaust from the diesel engine 2 conducted to the turbocharger through exhaust pipe 4. As in conventional turbochargers, the exhaust driven turbine is coupled either directly or through gearing, to an impeller which is spun at high speed to compress the incoming air charge to the intake of the diesel engine 2. A supercharger may be substituted for the turbocharger 3. The supercharger differs from the turbocharger in that the supercharger is powered by a mechanical drive usually driven off the engine and that the supercharger is generally a positive displacement compressor. Ambient intake air is inducted into the compression side of the turbocharger or supercharger 3. Inlet air temperatures may range from below zero degrees Fahrenheit (−18° C.) to above 100° F. (38° C.) temperatures. In the turbocharger 3, the pressure is raised from atmospheric to about 21 psig (1.5 bar-g) and the temperature can rise to above 300° F. (150° C.). Without cooling, the heated intake air both limits the volumetric intake of the engine and thereby limits the power, but also increases the incidence of detonation, or knock, of the fuel-air mixture.

In the embodiment of this invention, the heated air intake charge is passed from the turbocharger through an aftercooler 5, which is a heat exchanger preferably of the plate fin type commonly used for after- or intercooling turbocharged air intake using conventional cooling means. The heated and compressed intake air at up to about 300° F. (150° C.) is heat exchanged first against an ambient coolant, such as ambient air or water, by means such as a closed circuit of a conventional circulating coolant, such as an ethylene glycol solution which is cooled by conventional ambient air radiators to a temperature of about 125° F. (52° C.) in design summer conditions or lower (generally about 15° F. to 20° F. (8° C. to 10° C.) above ambient air conditions) or by means of direct heat exchange against the ambient coolant source, and is then subsequently heat exchanged against the fuel gas vaporizer heat exchange fluid which has a temperature in the range of from about 45° F. to 75° F. (from about 7° C. to 24° C.), preferably in the range of from about 50° F. to 60° F. (from about 10° C. to about 15° C.) by heat exchange means such as, but not limited to, a closed intermediate circulating coolant loop for exchanging heat between the compressed intake combustion air and the liquefied gaseous fuel or by direct heat exchange between the two such as, but not limited to a plate fin exchanger with compressed intake combustion air in one set of passages in heat exchange communication with the liquefied gaseous fuel. Heat may be exchanged between the compressed intake combustion air and the liquefied gaseous fuel in both the liquid and vaporized state of the liquefied gaseous fuel. With proper heat exchanger design, the hot intake air charge can be efficiently cooled to a temperature of from about 90° F. (32° C.) to about 120° F. (49° C.), preferably into the range of from about 100° F. (38° C.) to about 115° F. (46° C.) for optimum performance of the engine. The fuel gas vaporizer heat exchange fluid is circulated from the fuel gas vaporizer 6 through line 7 to circulating pump 8, through line 9 to the turbocharger aftercooler 5 and then back to the fuel gas vaporizer 6 through line 10. Storage tank 11 provides expansion room for the fuel gas vaporizer heat exchange fluid as well as an adequate reservoir of such heat exchange fluid. Primary coolant to the turbocharger aftercooler, preferably comprising an ethylene glycol-water solution although other conventional coolants may be used, is circulated by primary coolant pump 12 through line 13 to the turbocharger aftercooler 5 where it provides the initial cooling of the hot, compressed intake air, then through line 14 at a temperature in the general vicinity of 150° F. (65° C.) to air cooled radiators 15. From these air cooled radiators the primary coolant is returned to primary coolant pump 12 via line 16 at a temperature of generally 10° F. to 20° F. (5° C. to 10° C.) above ambient air temperature. Primary coolant storage tank 17 provides an adequate reservoir of primary coolant as well as thermal expansion space. It is important to employ the first ambient aftercooling step, since there will generally not be sufficient refrigeration capacity in the quantity of liquefied gaseous fuel being consumed by the diesel engine during operation. The initial ambient aftercooling stage efficiently removes the majority of the heat required to be removed from the compressed intake combustion air since there is a large temperature difference between the high temperature compressed intake air and the ambient cooling source and there is a great deal of heat transfer capacity, limited primarily by physical space constraints. The subsequent, or second, aftercooling stage afforded by the heat transfer to the refrigerated liquid utilizes the colder temperatures to lower the compressed intake air temperature below that obtainable with ambient cooling but does so generally through a smaller temperature range.

The RLM fuel gas for the diesel locomotive engine required for the trip is stored in the insulated tender car, 18, generally at approximately between about 40 to about 125 psig (about 2.7 to about 8.6 bar-g). At this pressure, the RLM is a saturated liquid at approximately −225° F. (−143° C.) to approximately −190° F. (−123° C.), depending upon storage pressure and liquid level. In one preferred embodiment, the RLM is subcooled as a liquid to allow pumping the RLM to a pressure high enough for direct injection into the combustion chambers of the diesel engine. In this embodiment, the RLM is taken from the storage tank via line 19 and conveyed to a subcooler 20. A portion of the liquid fuel exiting the subcooler 20, generally in the range of from about 2% to about 6% of the fuel flow to the subcooler is taken from the fuel line 21 and expanded across valve 22 to at least partially flash the liquid to a gas and to cool it further. The pressure is reduced to a level which produces the desired flash cooling while leaving the partially flashed fuel at a pressure sufficient to allow introduction of the partially flashed fuel into the combustion air intake, either before or after the turbocharger, or to other point of use. In this embodiment, approximately 3% of the fuel is removed as the flash sidestream and is flashed across valve 22 from about 125 psig (8.5 bar-g) to about 50 psig (3.4 bar-g) with the temperature of the sidestream dropping from about 15° F. to about 30° F. (from about 8° C. to about 17° C.) below the temperature of the subcooled fuel exiting the subcooler. This flashed gas is then heat exchanged against the RLM in the subcooler 20 to cool the RLM to from about 5° F. to about 10° F. (3° C. to about 6° C.) below its saturation temperature to facilitate subsequent pumping to high pressure by high pressure pump 23. The flashed gas in the preferred embodiment is conveyed through line 24 to the fuel gas vaporizer 6 wherein it provides additional refrigeration for cooling the compressed intake combustion air and is itself warmed from its cold temperature of between about −205° F. and −220° F. (−131° C. and −140° C.) to about ambient temperature. This sidestream of now warmed fuel gas may be directed via line 25 to the air inlet where it is blended with the intake air to the diesel engine 2 or it may be directed to other use or disposal points for the gas. Excess flash gas can be vented to atmosphere through vent valve 26 and vent line 27. The subcooled RLM remainder is passed from the subcooler 20 to high pressure pump 23 and pumped to the pressure necessary, generally in the range of about 3,500 to about 4,000 psig (240 to 280 bar-g) for injection into the combustion chambers of the diesel engine 2. The high pressure RLM is then conveyed through line 28 to the vaporizer 6 wherein it is warmed and vaporized in heat exchange with the vaporizer heat transfer fluid which is used to finally cool the intake air charge after compression in the turbocharger or supercharger 3. Generally, this coolant may be any of the commonly used heat transfer fluids, but a preferred fluid is an ethylene glycol-water solution. The outlet temperature of the warmed, vaporized gas is preferably controlled by means of temperature responsive flow controllers 29 on the heat transfer fluid to the vaporizer to be in the range of from about 45° F. to about 75° F. (from about 7° C. to about 24° C.), preferably in the range of from about 50° F. to about 60° F. (from about 10° C. to about 16° C.). The warmed and vaporized high pressure gas is then fed via line 30 to the fuel gas injection system 31 and into the combustion chambers. The fuel gas is injected into the combustion cylinders of the diesel engine, either in combination with No. 2 diesel fuel which serves as pilot ignition to ignite the gas fuel charge in dual fuel mode, or as primary fuel gas injection for gas only fueling. In another embodiment, the RLM is vaporized and warmed in a similar manner against the coolant, but is then compressed as a gas for injection into the combustion cylinders without the subcooler 20 or high pressure pump 23. In this mode, a commercially available compression-type injection system is used. The fuel gas may also be carbureted into the intake manifold 32 of the diesel engine at about the pressure of the supercharged air.

Figure 2:
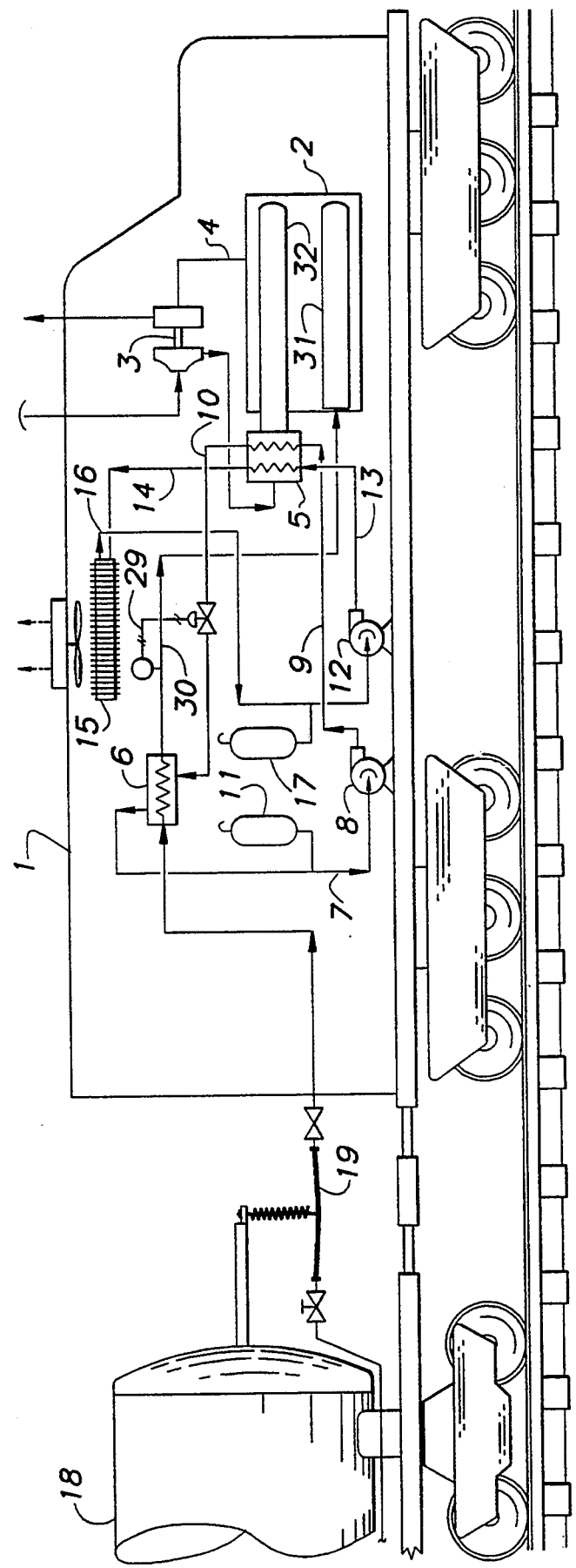
FIG. 2 shows an embodiment of the invention in a railroad locomotive similarly adapted to be fueled with a refrigerated liquid fuel wherein the liquid fuel is removed from the storage vessel at substantially saturated conditions and vaporized by heat transferred from the compressed intake combustion air by means of the aftercooler.

FIG. 2 shows a diesel locomotive similarly adapted to be fueled by a gaseous fuel derived from a refrigerated liquid accompanying the locomotive. However, in operation of this embodiment, the refrigerated liquid is removed from the insulated tender car 18 via liquid transfer line 19 at between about 40 to about 125 psig (about 2.7 to about 8.6 bar-g). At this pressure, the RLM is a saturated liquid at approximately −225° F. (−143° C.) to approximately −190° F. (−123° C.), depending upon storage pressure and liquid level. This saturated liquid is conveyed to vaporizer 6 where it is vaporized in heat exchange with an intermediate coolant carrying heat removed from the compressed intake combustion air in the aftercooler 5. From vaporizer 6, the vaporized gaseous fuel is conveyed via line 30 to the gas fuel injection compression system 31 of a type normally used for injecting a gaseous fuel into the combustion chambers of gas-fueled diesel engines.

Figure 3:
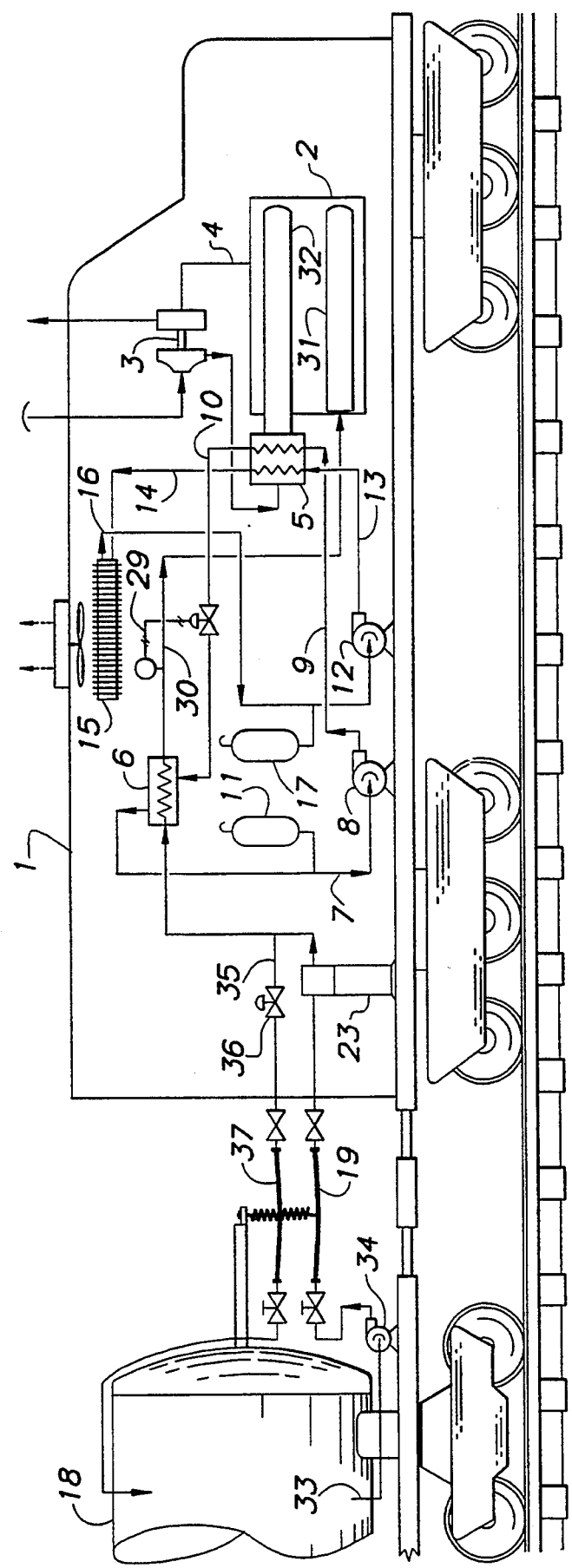
FIG. 3 shows the embodiment of the invention in a railroad locomotive similarly adapted to be fueled with a refrigerated liquid fuel wherein the liquid fuel is pumped from the tender storage to provide sufficient net positive suction head to satisfy the suction requirements of the high pressure pump, which then provides liquid fuel at a high injection pressure and the high pressure liquid fuel is then vaporized with heat removed from the compressed intake combustion air following the turbocharger or supercharger aftercooler using the circulating and temperature controlled heat transfer system.

FIG. 3 shows a diesel locomotive similarly adapted to be fueled by a gaseous fuel derived from a refrigerated liquid accompanying the locomotive. However, in operation of this embodiment, the refrigerated liquid is removed from the insulated tender car 18 via pump 34 and liquid transfer line 19 at between about 50 to about 125 psig (about 3.5 to 8.6 bar-g). At this pumped condition, the RLM is a subcooled liquid at approximately −230° F. (−145° C.) to approximately −200° F. (−129° C.), depending upon storage pressure and temperature. In this embodiment, the pumped liquid fuel is subcooled and pressurized sufficiently to satisfy the suction requirements of the high pressure pump 23 which raises the pressure as described in FIG. 1. In this embodiment, there is a recycle liquid line 35 and back pressure control valve 36 to maintain liquid in the pumps at all times.

Figure 4:
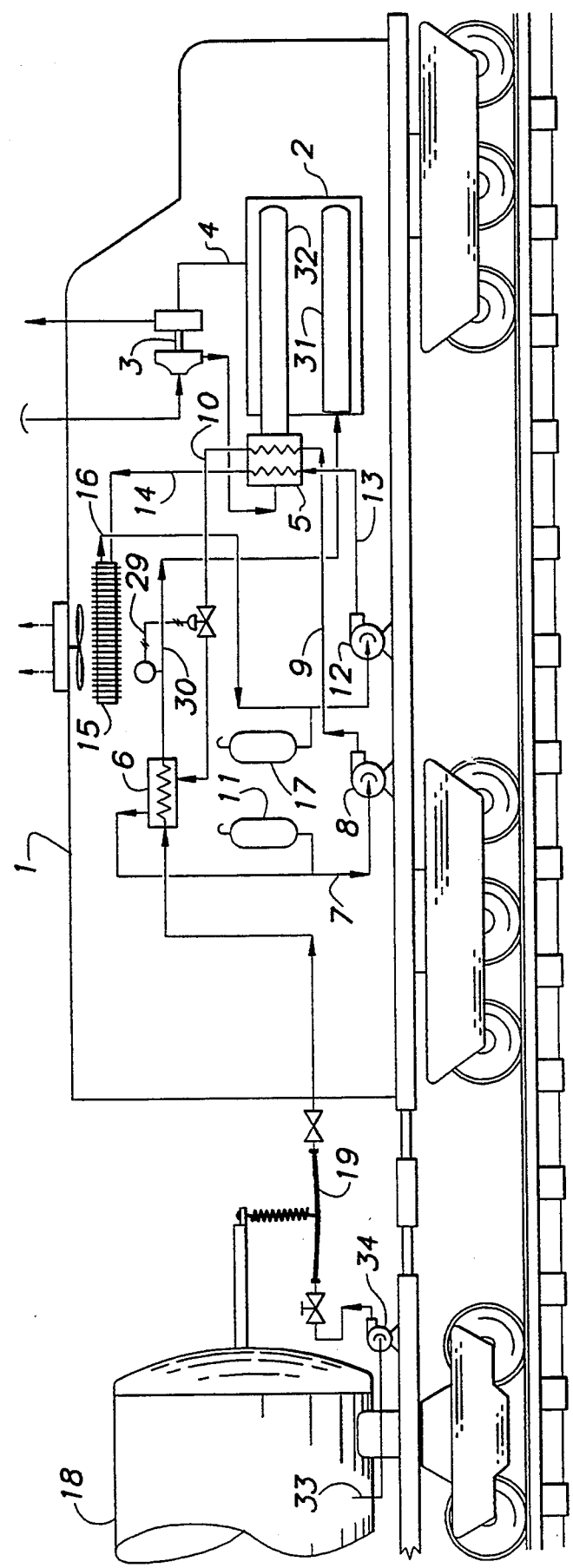
FIG. 4 shows the embodiment of the invention in a railroad locomotive similarly adapted to be fueled with a refrigerated liquid fuel wherein the liquid fuel is pumped from the tender storage with sufficient pressure to satisfy the suction requirements of a low pressure injection or atomized fueling system and is then vaporized with heat removed from the compressed intake combustion air following the turbocharger or supercharger aftercooler using the circulating and temperature controlled heat transfer system.

FIG. 4 shows a diesel locomotive similarly adapted to be fueled by a gaseous fuel derived from a refrigerated liquid accompanying the locomotive. However, in operation of this embodiment, the refrigerated liquid is removed from the insulated tender car 18 via pump 34 and liquid transfer line 19 at between about 50 to about 125 psig (about 3.5 to about 8.6 bar-g). At this pumped condition, the RLM is a subcooled liquid at approximately −230° F. (−145° C.) to approximately −200° F. (−129° C.), depending upon storage pressure and temperature. This subcooled liquid is conveyed to vaporizer 6 where it is vaporized in heat exchange with an intermediate coolant carrying heat removed from the compressed intake combustion air in the aftercooler 5. From vaporizer 6, the vaporized gaseous fuel is conveyed via line 30 to the gas fuel injection compression system 31 of a type normally used for injecting a gaseous fuel into the combustion chambers of gas-fueled diesel engines.

While the invention has been described in the context of a railroad diesel locomotive, it would be well within the capabilities of those of ordinary skill in the art to apply the teachings of this invention to other applications where a liquefied gaseous fuel is used to power an internal combustion engine after vaporization of the fuel wherein the vaporization of the fuel is capable of producing a bulk fuel flow having a temperature more than about 10° F. (5° C.) below available ambient temperature. For example, in a shipboard installation, the air cooled radiators would generally be replaced with water heat exchangers. For land-based stationary power plants utilizing a gas fueled diesel engine, the ambient cooling source may be either air-cooled radiators or water cooled heat exchangers utilizing either once-through cooling water or cooling water supplied from a conventional cooling tower. While in the figures, the liquefied gaseous fuel is carried in a separate tender car, the liquefied gaseous fuel could also be carried in a fuel container mounted on the same vehicle as the engine. This would be the preferred embodiment for trucks, ships, buses and cars.

We claim:

1. In an internal combustion engine fueled with a fuel gas vaporized from a liquefied gaseous fuel and having means for compressing the combustion intake air and an aftercooler for cooling the compressed combustion intake air against an ambient coolant source, and additional means for effecting heat exchange between the liquefied gaseous fuel and compressed combustion intake air whereby heat is removed from the compressed combustion intake air and said heat is transferred to the liquefied gaseous fuel, the improvement wherein said heat exchange means for effecting heat exchange between the liquefied gaseous fuel and the compressed combustion intake air comprises a cold fuel heat exchanger for indirect heat exchange between the liquefied gaseous fuel and a warmed intermediate circulating coolant wherein heat transferred from the warmed intermediate circulating coolant to the liquefied gaseous fuel lowers the temperature of the warmed intermediate circulating coolant to produce a chilled intermediate circulating coolant and warms the liquefied gaseous fuel to produce a warmed fuel; means for conducting the liquefied gaseous fuel to the cold fuel heat exchanger; means for conducting the warmed fuel to the combustion chambers of the internal combustion engine; means for conducting the chilled intermediate circulating coolant from the cold fuel heat exchanger to the intake air compressor aftercooler wherein the chilled intermediate circulating coolant is indirectly heat exchanged against the compressed combustion intake air to produce a chilled compressed combustion intake air charge and a warmed intermediate circulating coolant; and means for conducting the warmed intermediate circulating coolant back to the cold fuel heat exchanger.

2. The improvement of claim 1 wherein the liquefied gaseous fuel delivered to the cold fuel heat exchanger comprises a refrigerated liquid fuel and the cold fuel heat exchanger comprises means for vaporizing said refrigerated liquid fuel.

3. A locomotive interned combustion engine adapted to be fueled at least partially with a liquefied gaseous fuel supplied and vaporized from an accompanying storage vessel containing the liquefied gaseous fuel at pressures below about 200 psig (14 bar-g), said locomotive internal combustion engine comprising an internal combustion engine capable of being operated on a gaseous fuel that can be stored as a liquid at an ambient or subambient temperature while at pressures below about 200 psig (14 bar-g) and which, on expansion to the pressure for injection as fuel into the internal combustion engine, can achieve adiabatic temperatures of below about 50° F. (10° C.); means for compressing combustion intake air; a first compressed combustion intake air aftercooler for cooling the compressed combustion intake air against an ambient coolant; means for receiving vaporized gaseous fuel from a cold fuel heat exchanger for indirect heat exchange between the liquid fuel and a warmed intermediate circulating coolant wherein heat transferred from the warmed intermediate circulating coolant lowers the temperature of the warmed intermediate circulating coolant to produce a chilled intermediate circulating coolant and warms the liquid fuel to produce the vaporized gaseous fuel; means for conducting the vaporized gaseous fuel to the combustion chambers of the internal combustion engine; means for conducting the chilled intermediate circulating coolant from the cold fuel heat exchanger to a second intake sir compressor aftercooler wherein the chilled intermediate circulating coolant is indirectly heat exchanged against the compressed combustion intake air to produce a chilled compressed combustion intake air charge and a warmed intermediate circulating coolant; and means for conducting the warmed intermediate circulating coolant back to the cold fuel heat exchanger.

4. In an internal combustion engine fueled with a fuel gas vaporized from a liquefied gaseous fuel and having means for compressing the combustion intake air and an aftercooler for cooling the compressed combustion intake air against an ambient coolant source, and additional means for effecting heat exchange between the liquefied gaseous fuel and compressed combustion intake air whereby heat is removed from the compressed combustion intake air and said heat is transferred to the liquefied gaseous fuel, the improvement wherein said heat exchange means for effecting heat exchange between the liquefied gaseous fuel and the compressed combustion intake air comprises a cold fuel heat exchanger for indirect heat exchange between the liquefied gaseous fuel and a warmed intermediate circulating coolant wherein heat transferred from the warmed intermediate circulating coolant to the liquefied gaseous fuel lowers the temperature of the warmed intermediate circulating coolant to produce a chilled intermediate circulating coolant and warms the liquefied gaseous fuel to produce a warmed fuel; means for conducting the liquefied gaseous fuel to the cold fuel heat exchanger; means for conducting the warmed fuel to the combustion chambers of the internal combustion engine; means for conducting the chilled intermediate circulating coolant from the cold fuel heat exchanger to the intake air compressor aftercooler wherein the chilled intermediate circulating coolant is indirectly heat exchanged against the compressed combustion intake air to produce a chilled compressed combustion intake air charge and a warmed intermediate circulating coolant; and means for conducting the warmed intermediate circulating coolant back to the cold fuel heat exchanger, the intermediate circulating coolant being contained in a closed intermediate circulating coolant loop separate from the ambient coolant source.

5. In an internal combustion engine fueled with a fuel gas vaporized from a refrigerated liquid fuel and having means for compressing the combustion intake air and an aftercooler for cooling the compressed combustion intake air against an ambient coolant source, and additional means for effecting heat exchange between the refrigerated liquid fuel and compressed combustion intake air whereby heat is removed from the compressed combustion intake air and said heat is transferred to the refrigerated liquid fuel, the improvement further comprising means for conducting the refrigerated liquid fuel to a subcooler wherein the refrigerated liquid fuel is cooled below its saturation temperature to produce a subcooled liquid fuel; means for drawing off a sidestream of the subcooled liquid fuel and expanding and flashing the sidestream of subcooled liquid fuel to produce a further cooled flashed vapor; means for indirectly heat exchanging the cooled flashed vapor in the subcooler with the refrigerated liquid fuel; a pump for raising the pressure of the subcooled liquid fuel to produce a high pressure refrigerated liquid fuel; means for conducting the subcooled liquid fuel from the subcooler to the pump; and means for conducting the high pressure refrigerated liquid fuel from the pump to the heat exchange means for effecting heat exchange between the refrigerated liquid fuel and the compressed combustion intake air which comprises a cold fuel heat exchanger for indirect heat exchange between the high pressure refrigerated liquid fuel and a warmed intermediate circulating coolant wherein heat transferred from the warmed intermediate circulating coolant to the high pressure refrigerated liquid fuel lowers the temperature of the warmed intermediate circulating coolant to produce a chilled intermediate circulating coolant and warms the high pressure refrigerated liquid fuel to produce a vaporized fuel; means for conducting the high pressure refrigerated liquid fuel to the cold fuel heat exchanger; means for conducting the vaporized fuel to the combustion chambers of the internal combustion engine; means for conducting the chilled intermediate circulating coolant from the cold fuel heat exchanger to the intake air compressor aftercooler wherein the chilled intermediate circulating coolant is indirectly heat exchanged against the compressed combustion intake air to produce a chilled compressed combustion intake air charge and a warmed intermediate circulating coolant; and means for conducting the warmed intermediate circulating coolant back to the cold fuel heat exchanger.

* * * * *